March 10, 1964 W. H. GOETTL 3,124,259
FLOATING BOAT TRAILER

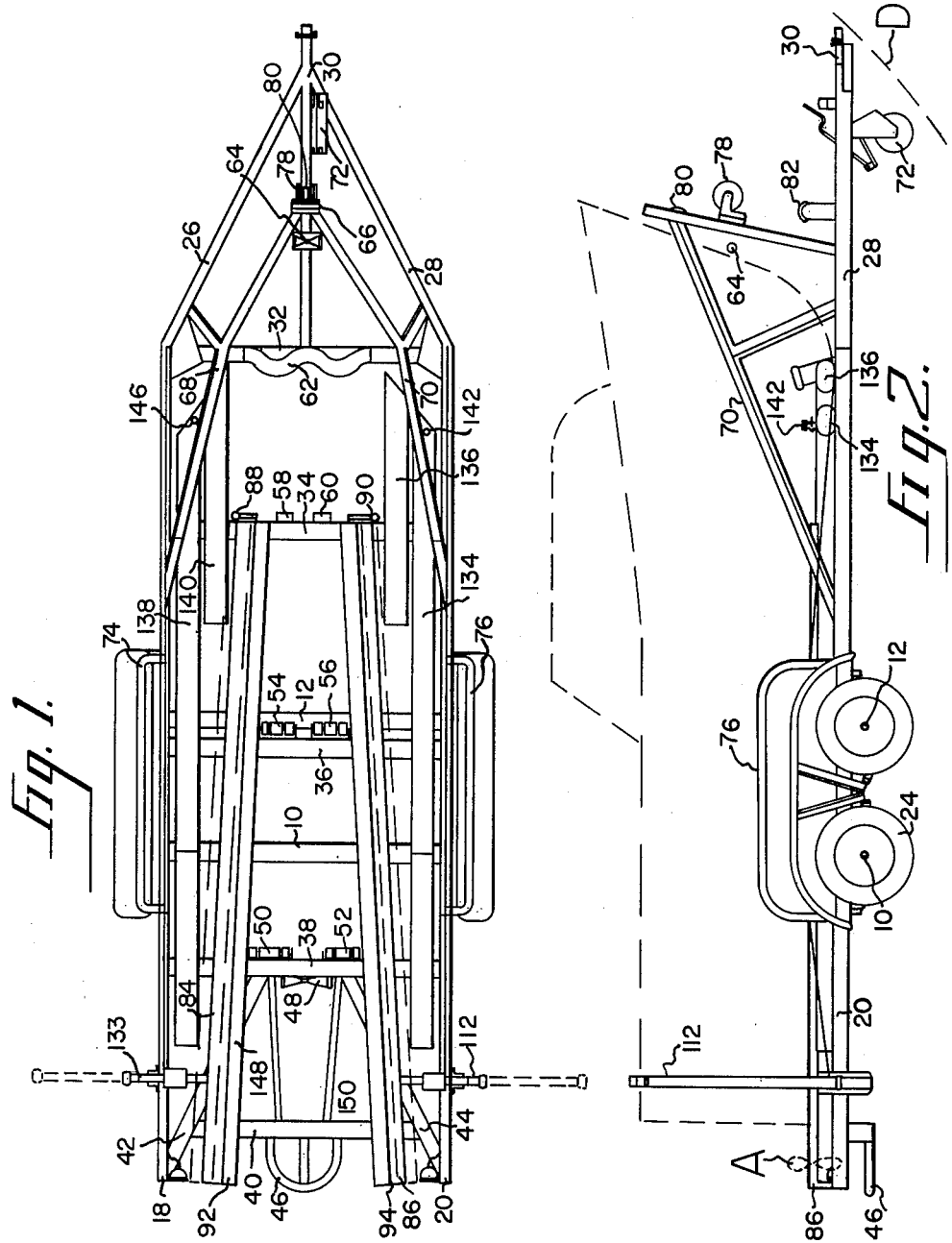

Filed Sept. 23, 1960 3 Sheets-Sheet 2

SHORE LINE

INVENTOR.
WILLIAM H. GOETTL
BY
Wm. H. Dean

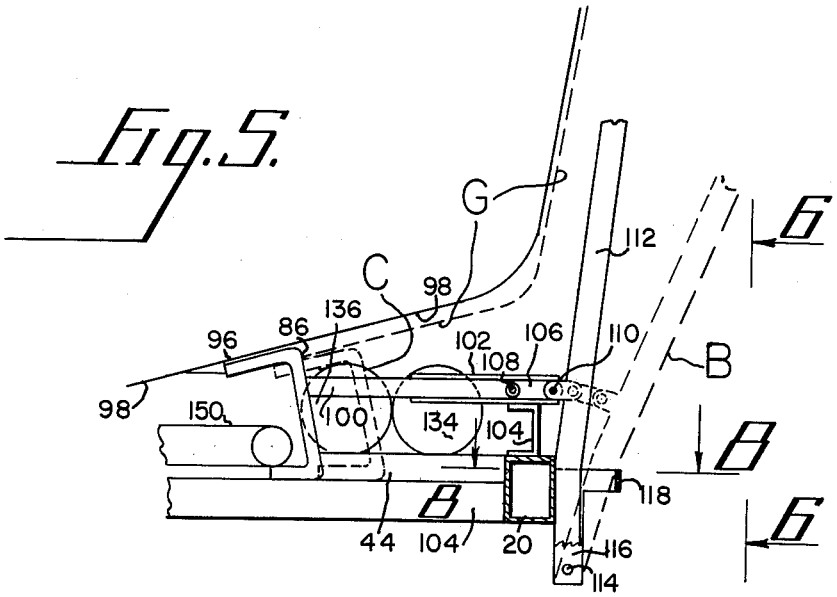
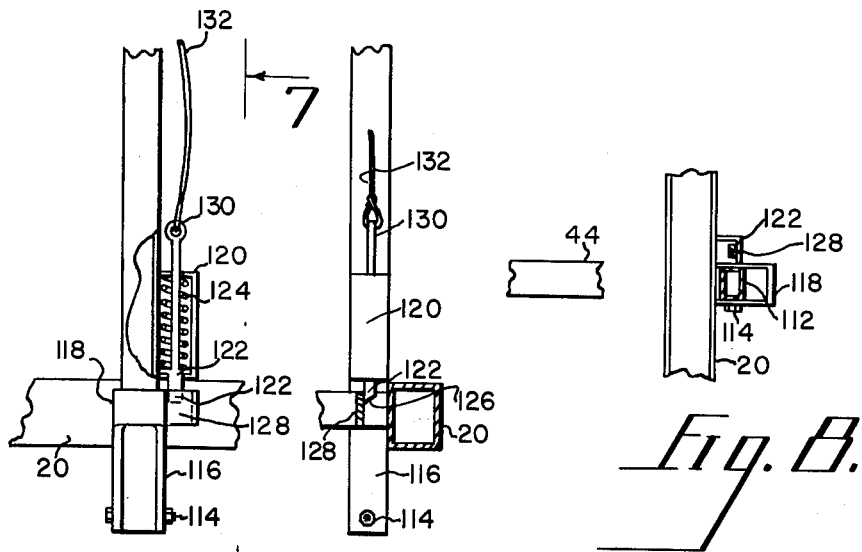

United States Patent Office 3,124,259
Patented Mar. 10, 1964

3,124,259
FLOATING BOAT TRAILER
William H. Goettl, 4627 N. Granite Reef Road, Scottsdale, Ariz.
Filed Sept. 23, 1960, Ser. No. 58,060
4 Claims. (Cl. 214—84)

This invention relates to a floating boat trailer and more particularly to a floating boat trailer for launching boats and also serving as a floating boat dock.

The launching of boats from trailers and also the loading of boats onto trailers adjacent the shore line of a lake or other waterway has presented many problems and difficulties.

When launching a relatively heavy boat from a trailer to the water, it has been customary to lower the trailer into the water and to permit the wheels thereof to roll upon the bottom of a ramp until the boat is substantially afloat.

When a boat is quite heavy and the trailer must roll on the waterway bottom great difficulty has occurred in launching boats where the bank is steep at the shoreline. Furthermore, the loading of boats onto trailers under such conditions has been extremely difficult.

Another difficulty has occurred when loading boats onto trailers at the shoreline when the wheels of the trailer are on the ground and there is a slight breeze tending to cause difficulty in the alignment of the boat with the trailer.

Accordingly, it is an object of the invention to provide a floating trailer for boats which greatly facilitates the launching and or loading of a boat adjacent the shoreline of a waterway.

Another object of the invention is to provide a floating boat trailer which serves as a floating dock for boats to protect them when anchored or secured adjacent a shoreline.

Another object of the invention is to provide a floating trailer for boats which may remain attached to the boat during propulsion of the boat in the water by its usual propeller or propulsion means.

Another object of the invention is to provide a floating boat trailer on which the boat may remain during normal propulsion of the boat by its propeller and whereby the trailer is provided with a shield below the propeller which prevents it from striking obstructions during transportation of the boat and the trailer in the water.

Another object of the invention is to provide a floating boat trailer which floats in the water adjacent the shoreline of a waterway whereby the trailer may readily be swung about at varying angles to receive a boat adjacent the shoreline thereby greatly facilitating the alignment of the trailer with the boat as it approaches the shoreline particularly when loading a boat on the trailer during windy weather conditions.

Another object of the invention is to provide a floating boat trailer having means thereon for elevating the boat with respect to the trailer after the boat has been driven thereon in the water.

Another object of the invention is to provide a floating boat trailer having novel means providing a converging guide between which the bow of a boat may be driven when loading the boat onto the trailer in the water and wherein means is provided for moving the converging guide means together for elevating the boat relative to the trailer and thereby securely holding the boat in position on the trailer for removal of the boat and trailer from the water and subsequent transportation of the boat on the trailer.

Another object of the invention is to provide a novel means for elevating the boat on the trailer when in the water by manual effort exerted by persons in the boat.

Another object of the invention is to provide a floating boat trailer having a novel combination of keel engaging rollers on the boat and elevating means adapted to support a boat on the trailer when in the water and for elevating the boat relative to the trailer after being driven thereon.

Further objects and advantages of the invention may be apparent from the following specification, appended claims and accompanying drawings in which:

FIG. 1 is a top or plan view of a floating boat trailer in accordance with the invention.

FIG. 2 is a side elevational view thereof showing by broken lines a boat mounted on the trailer in water and illustrating an inclined shoreline by broken lines.

Figure 4:
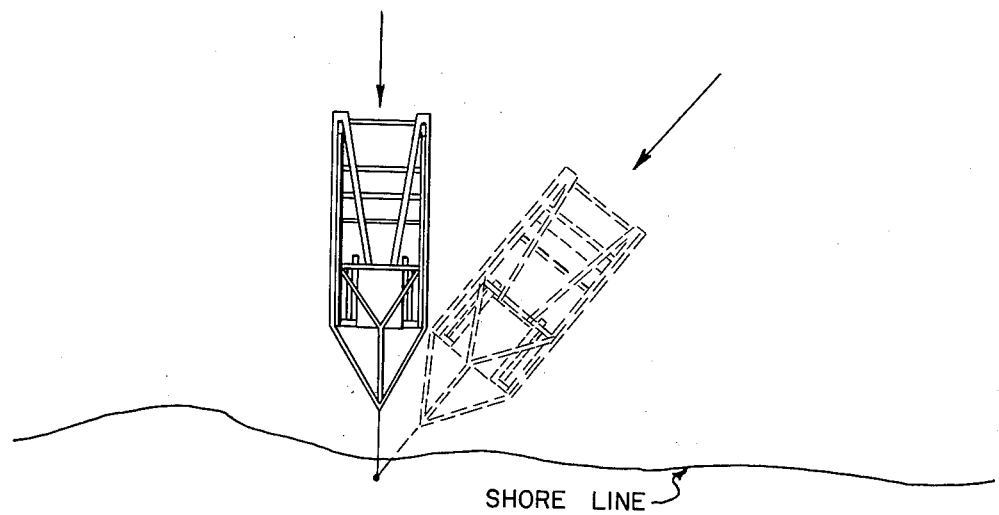

FIG. 4 is a reduced scale top or plan view of the floating boat trailer of the invention anchored adjacent a shoreline and floating in the water and illustrating by broken lines varying angular positions of the trailer with respect to the shoreline whereby the boat trailer may be swung around in the water in order to align it with a boat approaching the shoreline for loading the boat on the trailer.

FIG. 5 is an enlarged fragmentary rear end view of one corner of the frame of the floating boat trailer in accordance with the invention showing the boat elevating means thereof and illustrating by broken lines a varying position of the boat elevating means together with solid and broken line superimposed positions of a boat hull corresponding therewith.

FIG. 6 is a fragmentary side elevational view taken from the line 6—6 of FIG. 5 and showing portions further broken away and in section to amplify the illustration.

FIG. 7 is another fragmentary side elevational view taken from the line 7—7 of FIG. 6 showing the elevator latch mechanism of the invention; and FIG. 8 is a fragmentary plan sectional view taken from the line 8—8 of FIG. 5.

Figure 3:
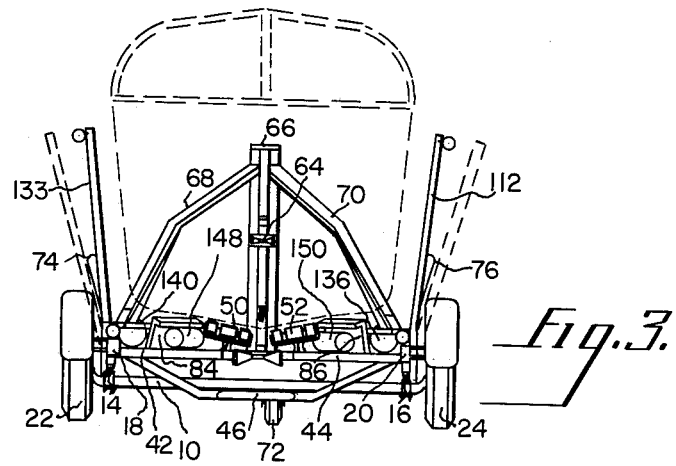
FIG. 3 is a rear end view of the floating boat trailer of the invention showing by broken lines the cross section of a boat mounted on the trailer.

As shown in FIG. 2 and FIG. 3 of the drawings, the trailer of the invention is provided with a pair of axles 10 and 12 which are mounted on springs 14 and 16 coupled to frame rails 18 and 20, respectively. The wheels 22 and 24 are rotatably mounted on the axle 10 while similar wheels are rotatably mounted on the axle 12. The frame members 18 and 20 are hollow hermetically sealed box shaped in cross section frame members which extend longitudinally of the trailer and which are provided with converging portions 26 and 28 at the forward portion of the trailer. These converging portions 26 and 28 are secured together and support a trailer hitch 30 at the extreme end of the trailer. The frame members 18 and 20 are interconnected by cross members 32, 34, 36, 38 and 40.

Angularly disposed braces 42 and 44 interconnect the side frame members 18 and 20 and the cross member 38 as shown best in FIG. 1 of the drawings.

The rear cross member 40 is disposed below the frame members 18 and 20 and projecting rearwardly from the cross member 40 is a propeller protecting guard 46 which is disposed low enough to shield the boat propeller as will be hereinafter described in detail.

Mounted on the cross member 38 is a keel guide roller 48 as well as hull supporting rollers 50 and 52 spaced axially of each other and on the opposite side of the cross member 38 from the keel guide rollers 48.

Carried by the cross member 36 are hull supporting rollers 54 and 56 axially spaced at opposite sides of the keel area of the boat when located on the trailer.

Rotatably supported on the cross member 34 are hull supporting rollers 58 and 60.

Mounted on the cross member 32 is a padded cradle 62 disposed to receive the boat and support the forward portion of the boat hull while a small keel engaging roller 64 is carried by an upright 66 of the frame for limiting forward movement of the boat when in the trailer.

Coupled to the upright 66 are angular side braces 68 and 70. The opposite ends of the braces 68 and 70, from the ends thereof which are connected to the member 66, are fixed to the frame members 18 and 20, respectively.

Adjustably mounted on the front of the trailer adjacent the trailer hitch 30 is a conventional caster wheel 72.

Secured to the frame members 18 and 20 and positioned adjacent the wheels of the trailer are side bars 74 and 76, respectively, which are directed upwardly and outwardly at a slight angle as shown in FIG. 3 of the drawings.

Secured to the upright member 66 is a small winch 78 disposed to operate a cable over a roller 80 to pull the boat onto the trailer, or this winch 78 may be disposed to operate a cable over a stationary pulley 82 for the purpose of pulling the boat and trailer from the water and up onto the shore.

Boat elevating members 84 and 86 are hinged to the cross member 34 by means of hinges 88 and 90, respectively. The axes of these hinges 88 and 90 are substantially vertical and the boat elevating members 84 and 86 at their rear ends 92 and 94, respectively, are freely movable laterally of the trailer in order to permit these boat elevating members 84 and 86 to be disposed in diverging relationship as shown by broken lines or may be permitted to pivot inwardly toward each other as indicated by solid lines in FIG. 1 of the drawings.

Referring to FIG. 5 of the drawings it will be seen that one side of the boat trailer of the present invention is shown on enlarged scale. The mechanism for moving the boat elevating member 86 is similar to the mechanism for moving the boat elevating member 84 and therefore only the mechanism employed for moving the boat elevating member 86 will be herein described.

The boat elevating member 86 is substantially channel shaped in cross section and is provided with a pad 96 on the upper surface thereof disposed to engage the bottom 98 of a boat disposed on the trailer. Coupled to the boat elevating member 86 is a draw bar 100 which is slidably mounted in a fixed tubular bearing 102 which is rigidly supported on the frame member 20 by a bracket 104. A link 106 is pivotally connected to the bar 100 by a pin 108 and another pin 110 pivotally connects the link 106 to a manually operable lever 112.

This lever 112 is pivotally mounted on a pin 114 carried by a bracket 116 fixed to the frame member 20 at its outer side. This bracket 116 is provided with a U shaped stop loop 118 disposed to limit the outward movement of the lever 112 about its pivotal axis 114 as indicated by broken lines B.

Mounted on the arm 112 is a latch cylinder 120 having a latch plunger 122 therein which is loaded into latching position by a spring 124 The plunger 122 is provided with a beveled latch portion 126 engageable with a loop member 128 carried on the side of the bracket 116.

The plunger 122 is provided with a loop 130 projecting upwardly from the casing 120 and a pull cord 132 extends to the upper end of the handle 112 so that the latch 126 may be relieved from the loop 128 to permit pivotal movement of the handle 112 outwardly to the broken line position B as shown in FIG. 5 of the drawings to retract the boat elevating member 86 to the broken line position C shown in FIG. 5 of the drawings.

A handle 133 is disposed on the opposite side of the trailer from the handle 112 and is coupled with and operates substantially identical mechanism as that disclosed in connection with the handle 112.

Coupled to the cross members 34, 36 and 38 are floats 134 and 136 adjacent to the frame member 20.

Near the opposite side of the trailer adjacent the frame member 18 are floats 138 and 140 which are supported on the cross members 34, 36 and 38.

The floats 134 and 140 are provided with valves 142 and 146 to provide for a desired degree of flotation as desired.

Coupled to the boat elevating members 84 and 86 are floats 148 and 150 as shown best in FIGS. 1 and 5 of the drawings.

The hollow tubular frame members 18 and 20 being hermetically sealed serve as floats while the floats 134, 136, 138, 140, 148 and 150 also provide for buoyancy of the trailer. Additionally, tires on the wheels of the trailer serve buoyantly to support the same in the water.

It will be appreciated by those skilled in the art that when a boat is loaded on the trailer as shown in FIG. 5 of the drawings and when a boat is supported on the boat elevating members 84 and 86 that the bottom of the boat clears the rollers 50, 52, 54, 56, 58 and 60.

Thus, the boat is transported on the trailer and when the trailer is moved into the water with the boat thereon as shown in FIG. 2 of the drawings even though the trailer may be moved off a steep bank as indicated by broken lines D it floats in the water which is at substantially a level E. The trailer supports the boat which is secured at its bow by means of a cable connected to the winch 78 and the propeller A is disposed above the propeller guard 46 and may be operated to propel the boat and trailer in the water. Thus, the trailer may be taken to any location as desired and utilized as a dock to protect the boat from shoreline obstructions such as rock or other features which would tend to damage the boat during its normal bobbing movement along the shoreline as the water tends to ripple due to winds or other disturbances.

When it is desired to release the boat from the trailer and operate the boat without the trailer, the trailer may be anchored to the shoreline and the pull cords 132 shown in FIG. 6 of the drawings are pulled to retract the latch portions 126 from the loops 128 thereby releasing the levers 112 and 133. When these levers 112 and 133 are released they move outwardly to the broken line positions shown in FIG. 3 of the drawings thereby retracting the boat elevating members 84 and 86 outwardly as indicated by broken lines in FIG. 5 of the drawings whereby they move outwardly on the incline of the hull of the boat permitting it to settle to the broken line position G shown in FIG. 5 of the drawings. The boat floats then partially in the water and is partially supported on the rollers 50, 52, 54, 56, 58 and 60 in accordance with the buoyancy level of the trailer as determined by the amount of flotation of the floats 134 and 138 which may be partially filled with water by means of the valves 142, and 146, respectively. This adjustable flotation of the trailer permits it to be adjusted with respect to the level at which the bottom of the boat at 98 will be disposed when in the water.

It will be seen that the boat elevating members 84 and 86 are diverging rearwardly so that the boat may readily be backed out of the trailer and removed therefrom. Conversely, the converging forward disposition of these elevating members serves as as guide for entering the boat onto the trailer and due to the fact that the trailer floats it automatically swings about and aligns with the keel or hull of the boat when the boat runs between the converging boat elevating members 84 and 86.

It will be understood that a person may stand on the rear cross member or the cross member 38 as desired when the boat bow approaches the trailer so that the stern or rear end of the trailer may be depressed slightly for entrance of the bow of the boat into position over the keel guiding roller 48 and between the hull supporting rollers 50 and 52.

The handles 112 and 133 are then spread apart as indicated by broken lines in FIG. 3 of the drawings, permitting the hull of the boat easy access and guidance as it enters the trailer even though rough weather prevails and the boat together with the trailer tends to rock about.

As shown in FIG. 4 of the drawing it will be apparent that the trailer may be swung from the solid line position to the broken line position or any suitable position as desired when the boat is adjacent the shoreline and it is desired to align the trailer therewith so that the boat may be loaded. Usually during rough weather it is a very difficult task to steer a boat adjacent a shoreline if the water becomes quite rough and the boat tends to jacknife with relation to the trailer. However, according to the present invention the trailer floats in the water and the boat elevating members 84 and 86 together with the handles 112 and 132 provide guide means for entering the boat on the trailer and the trailer may readily be swung about in the water to align with the approaching boat to compensate for difficulty of steering and direction as the boat approaches the shoreline for loading. When the boat is at a position to enter the trailer and when the bow is between the boat elevating members 84 and 86 a cable from the winch may be extended over the pulley 80 and back to the bow of the boat for pulling the boat into place as shown in FIG. 2 of the drawings. The levers 112 and 133 may then be pulled inwardly from the broken line positions as shown in FIG. 3 to the solid line positions which forces the boat elevating members 84 and 86 to pivot about their axle pins 88 and 90 and to cause the rear ends of these boat elevating members to move toward each other whereby they move inwardly on the inclines 98 of the hull as shown in FIG. 5 of the drawings thereby elevating the boat from the broken line position G to the solid line position and securely supporting the boat on the trailer. It will be understood that when this operation is performed in the water that there is relative elevation since the boat may be slightly elevated while the trailer may be slightly depressed in the water.

When the boat is securely loaded and the arms 112 and 133 are pulled inwardly the latch members 126 are engaged with the loops 128 thereby to hold the boat elevating members 84 and 86 securely in position. In this position the hull of the boat is elevated above the rollers 50, 52, 54, 56, 58 and 60 and these boat elevating members 84 and 86 then provide a uniform support which is quite continuous longitudinally of the hull and extending over a considerable area thereof in order to distribute the weight of the boat over a large area and thereby alleviate damaging of the boat hull by concentrated bearing on the rollers 50, 52, 54, 56, 58 and 60. These rollers are only intended to provide facility in the loading of the boat on the trailer while the boat elevating members 84 and 86 are employed almost entirely for supporting the boat thereon during transportation thereof.

It will be appreciated that the floating boat trailer of the invention greatly facilitates the handling of various boats and particularly heavy boats such as cabin cruisers or the like and will permit one man to load and unload a boat in the water and to transport and launch the boat without difficulty. Further, it will be appreciated that a heavy boat may be launched from a fairly steep bank into the water since the trailer floats up to the shoreline. Thus, a boat may be launched in water where the shoreline may be quite precipitous or in locations where the waterway bottom is soft. It will be obvious that a concrete ramp is not needed to launch a heavy boat when employing the floating trailer of the present invention. Furthermore, it will be apparent that a boat may be loaded on the floating trailer of the invention during rough, windy weather without difficulty and with a minimum danger of damage to the boat and the operator.

Additionally, it will be appreciated that the floating boat trailer is very useful in areas where tides prevail.

The trailer may be anchored in a location as desired and a heavy boat may readily be driven ashore thereon without danger and without the usual inconveniences of maintaining help to move a trailer into position along shore to receive the boat.

It will be obvious to those skilled in the art that various modifications of the present invention may be resorted to in a manner limited only by a just interpretation of the following claims.

I claim:
1. In a floating boat trailer the combination of: a trailer; buoyant means thereof causing said trailer to float in water; first means for supporting a boat on said trailer; and second means mounted on said trailer for elevating a boat thereon, said means for supporting a boat comprising hull engaging rollers; said second means operable to raise a boat to a position above the upper surface of said rollers, said second means comprising manually operable levers pivoted to said frame and extending upwardly at opposite sides thereof, said levers disposed to pivot outwardly in opposite directions away from the center of said frame; and hull engaging supports movably connected with said lever and movable laterally in a substantially horizontal plane by said levers and disposed to elevate the hull of a boat relative to said frame.

2. In a floating boat trailer the combination of: a trailer; buoyant means thereof causing said trailer to float in water; first means for supporting a boat in said trailer; and second means mounted on said trailer for elevating a boat thereon, said second means comprising hull engaging supports having forward ends directed toward the forward end of said frame, means pivotally mounting said forward ends on vertical axes; rear ends of said hull engaging supports being movable apart laterally in a substantially horizontal plane; said second means including third means for moving said supports toward and away from each other at their ends; whereby said supports acting on the incline portion of a boat hull tend to elevate it relative to said frame.

3. In a floating boat trailer the combination of: a trailer; buoyant means thereof causing said trailer to float in water; first means for supporting a boat on said trailer; and second means mounted on said trailer for elevating a boat thereon, said means for supporting a boat comprising hull engaged rollers; said second means operable to raise a boat to a position above the upper surface of said rollers, said second means comprising manually operable levers pivoted to said frame and extending upwardly at opposite sides thereof, said levers disposed to pivot outwardly in opposite directions away from the center of said frame; and hull engaging supports movably operable by said levers and disposed to elevate the hull of a boat relative to said frame, said second means comprising hull engaging supports having forward ends directed toward the forward end of said frame, said forward ends pivoted on vertical axes, rear ends of said hull engaging supports being movable apart laterally in a substantially horizontal plane; said second means including third means for moving said supports toward each other at their rear ends whereby said supports acting on the inclined portions of a boat hull tend to elevate it relative to said frame.

4. In a floating boat trailer the combination of: a trailer; buoyant means thereof causing said trailer to float in water; first means for supporting a boat on said trailer; and second means mounted on said trailer for elevating a boat thereon, said means for supporting a boat comprising hull engaging rollers; said second means operable to raise a boat to a position above the upper surface of said rollers; said second means comprising manually operable levers pivoted to said frame and extending upwardly at opposite sides thereof, said levers disposed to pivot outwardly in opposite directions away from the center of said frame; and hull engaging supports movably operable by said levers and disposed to elevate the hull of a boat relative to said frame; said second means comprising hull engaging supports having forward ends directed toward the forward end of said frame, said forward ends pivoted on vertical axes, rear ends of said hull engaging supports being movable apart laterally in a substantially horizontal plane; said second means including third means for moving said supports toward each other at their rear ends whereby said supports acting on the inclined portions of a boat hull tend to elevate it relative to said frame, said levers when pivoted outwardly to move said hull engaging supports apart at their rear ends providing guides disposed to receive a boat when driven or pulled onto said trailer from the rear end thereof.

References Cited in the file of this patent

UNITED STATES PATENTS

| | | |
|---|---|---|
| 2,361,951 | Livermon | Nov. 7, 1944 |
| 2,389,338 | Zorc | Nov. 20, 1945 |
| 2,586,485 | Schroeder | Feb. 19, 1952 |
| 2,722,697 | Wilkinson | Nov. 8, 1955 |
| 2,827,304 | Backus | Mar. 18, 1958 |
| 2,865,522 | Peterson et al. | Dec. 23, 1958 |
| 2,901,138 | Whalen | Aug. 25, 1959 |
| 2,917,194 | Streater | Dec. 15, 1959 |
| 3,004,771 | Moore | Oct. 17, 1961 |
| 3,056,517 | Trumbull | Oct. 2, 1962 |